US009328751B1

(12) United States Patent
Liu

(10) Patent No.: US 9,328,751 B1
(45) Date of Patent: May 3, 2016

(54) EFFORT-SAVING CLAMP STRUCTURE

(71) Applicant: Sung-Chi Liu, Taichung (TW)

(72) Inventor: Sung-Chi Liu, Taichung (TW)

(*) Notice: Subject to any disclaimer, the term of this patent is extended or adjusted under 35 U.S.C. 154(b) by 0 days.

(21) Appl. No.: 14/563,649

(22) Filed: Dec. 8, 2014

(51) Int. Cl.
*F16B 2/18* (2006.01)
*F16B 2/16* (2006.01)
*F16B 2/12* (2006.01)

(52) U.S. Cl.
CPC . *F16B 2/185* (2013.01); *F16B 2/12* (2013.01); *F16B 2/16* (2013.01)

(58) Field of Classification Search
CPC .......... B25B 5/067; B25B 5/082; B25B 5/101
See application file for complete search history.

(56) References Cited

U.S. PATENT DOCUMENTS 6,648,314 B1 * 11/2003 Degen .................... B25B 5/163 269/166
7,040,609 B1 * 5/2006 Liou ...................... B25B 5/068 269/3
7,530,556 B1 * 5/2009 Zheng .................... B25B 5/085 269/143
8,038,135 B2 * 10/2011 Phillips, Sr. ............. B25B 1/08 269/1
8,177,209 B2 * 5/2012 Chen ........................ B25B 1/08 269/143
8,783,671 B2 * 7/2014 Ranieri .................... B25B 5/06 269/207
9,168,641 B2 * 10/2015 Chen ....................... B25B 5/068
2008/0136077 A1 * 6/2008 Yang ....................... B25B 5/127 269/6
2015/0174737 A1 * 6/2015 Chen ....................... B25B 5/085 269/6

* cited by examiner

*Primary Examiner* — Lee D Wilson
(74) *Attorney, Agent, or Firm* — Che-Yang Chen; Law Offices of Scott Warmuth

(57) ABSTRACT

A clamp may include a fixed clamp, a movable clamp, a control handle and a restricting unit. The fixed clamp has a clamping block and a rod. The movable clamp has a clamping unit which faces the clamping block, and a teeth unit disposed at a rear side of the clamping unit. The control handle has a receiving slot near the teeth unit, and a plug disposed on both sides of the receiving slot. The restricting unit has a non-circular elongated slot and disposed at the receiving slot and a plug is passing through the elongated slot. A teeth portion of the restricting unit and teeth unit are engaged with each other, and when the restricting unit is pressed to separate the teeth portion and teeth unit, the restricting unit moves along the elongated slot to drive the teeth portion to move backwards to separate from the teeth unit.

3 Claims, 7 Drawing Sheets

11 22 23 42 33 40 30 10 25 24 41 43 31 20 21 211 12 213 212 214

EFFORT-SAVING CLAMP STRUCTURE

FIELD OF THE INVENTION

The present invention is related to a clamp structure, and more particularly to an improved clamp structure that is configured to easily release the clamped object.

BACK GROUND OF THE INVENTION

As shown in FIG. 7, a conventional clamp 50 may include a long rod 51 connected with a fixed arm 52 and a moving arm 53. The moving arm 53 is connected to a clamping block 54 and a handle 55, so the handle 55 can drive the clamping block 54 to press toward the fixed arm 52. A teeth unit 531 is formed at the moving arm 53 and a release button 56 pivotally connected with a shaft rad 5521 is formed at the handle 55. One end of the release button 56 is connected to the teeth unit 531 through a teeth portion 561 and the other end has a spring 57. When it is used to clamp an object, the teeth portion 561 engages with the teeth unit 531 to secure the clamped object. When releasing the object, the handle 55 is pressed so the release button 56 pops up at the end of the teeth portion 561, and the release button 56 is pressed to detach the teeth portion 561 from the teeth unit 531 to drive the moving arm 53 away.

However, the conventional clamp is disadvantageous because a counterforce is generated when the clamping block 54 clamps the object so the teeth unit 531 would tightly engage with the teeth portion 561 so the teeth portion 561 is not easy to separate from the teeth unit 531. Namely, the user cannot release the clamp directly from the release button 56 so the user has to press the handle 55 first, and the user has to spend certain extra effort in order to release the clamped object. Therefore, there remains a need for a new and improved clamp structure to overcome the problems stated above.

SUMMARY OF THE INVENTION

To solve the problems stated above, the present invention provides a clamp releasing structure may include a fixed clamp, a movable clamp, a control handle and a restricting unit. The fixed clamp has a clamping block and a rod. One end of the movable clamp has a through hole located at the rod of the fixed clamp, while the other end of the movable clamp has a clamping unit which faces the clamping block. A teeth unit is disposed at a rear side of the clamping unit, and an elongated hole is formed along the moving direction of the clamping unit. The clamping unit further includes a shaft rod that inserts into the elongated hole.

One end of the control handle is connected to the movable clamp and clamping unit, and the control handle has an elongated groove for the shaft rod to pass through, and the control handle can drive the shaft rod through the elongated groove to move along the elongated hole, so the control handle can achieve a clamping effect through the clamping unit and clamping block. The control handle also has a receiving slot near the teeth unit, and a plug is disposed on both sides of the receiving slot. The restricting unit disposed at the receiving slot of the control handle has a non-circular elongated slot, and one end of the restricting unit facing the teeth unit forms a teeth portion while the other end thereof has a resilient unit. The resilient unit is configured to press the control handle so the teeth portion and teeth unit are engaged with each other at all time. When the restricting unit is trying to separate the teeth portion and teeth unit, the restricting unit moves along the elongated slot to drive the teeth portion to move backwards to separate from the teeth unit.

In another embodiment, a screw hole is formed at the through hole of the movable clamp, and a rolling ball and a spring are disposed in the screw hole. A locking unit is further disposed at the screw hole, so the rolling ball can be resiliently disposed against the rod to eliminate the gap between the movable clamp and the rod to increase the smoothness of the movement of the movable clamp.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
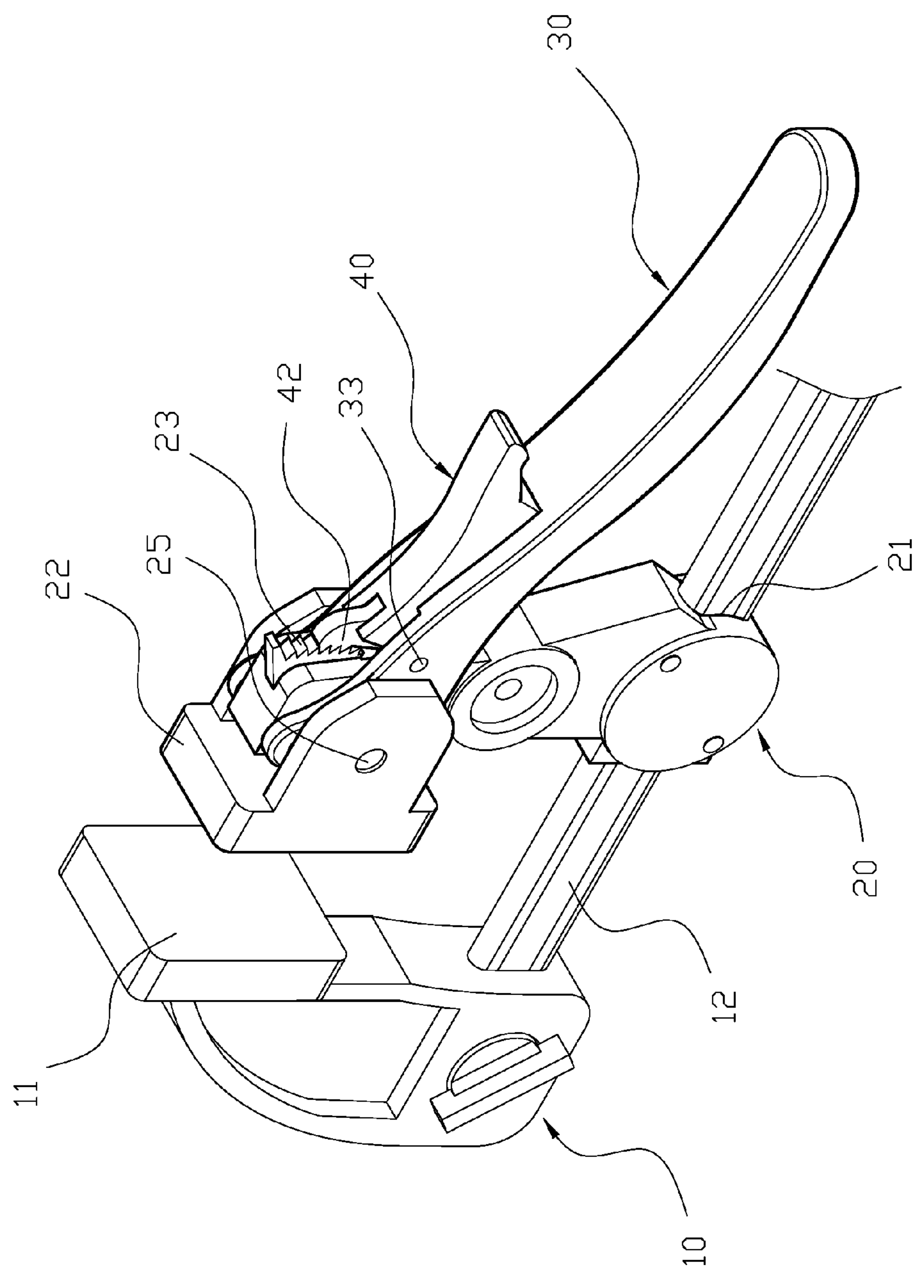
FIG. 1 illustrates a three-dimensional view of the clamp structure in the present invention.
Figure 2:
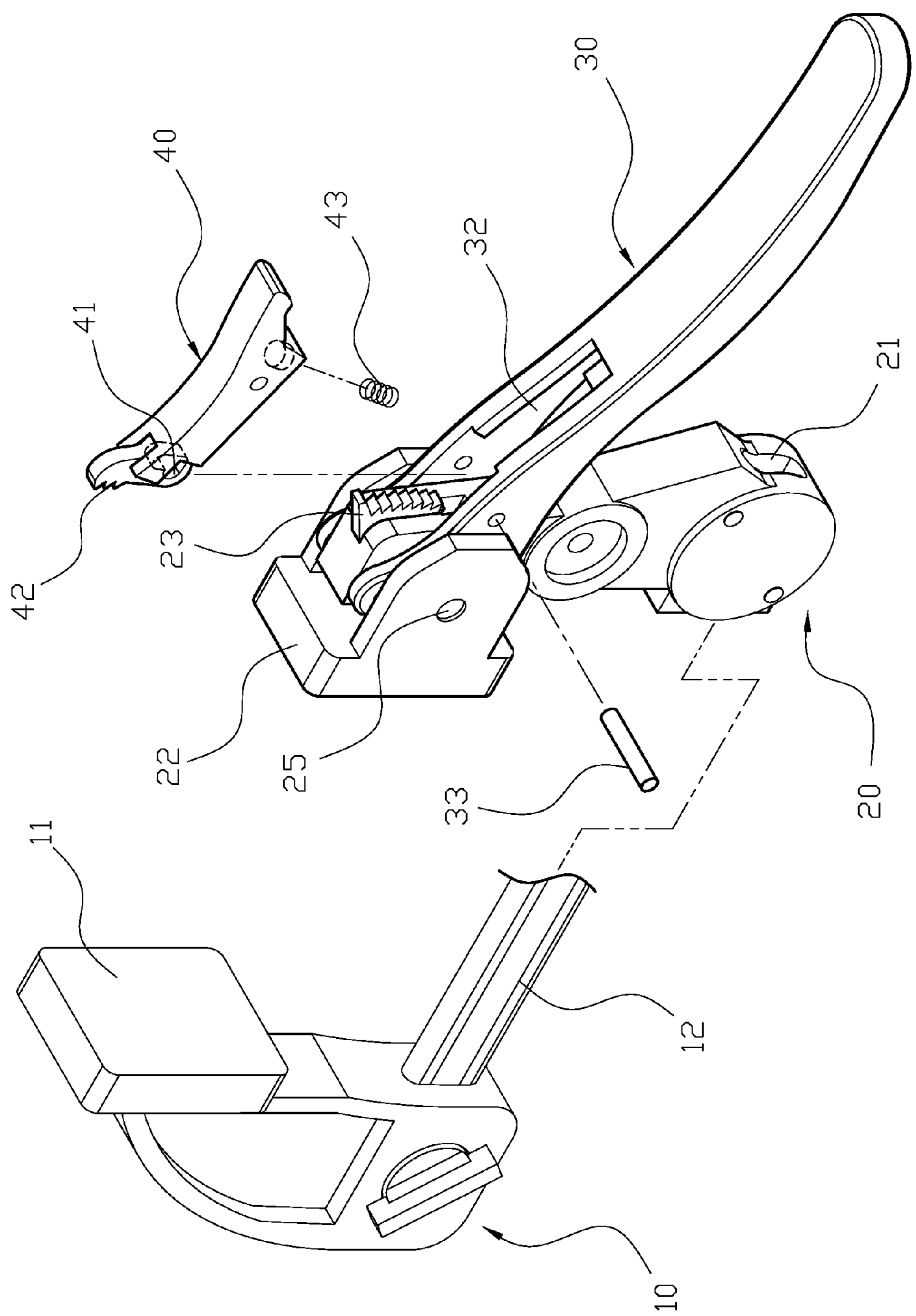
FIG. 2 illustrates an exploded view of the clamp structure in the present invention.
Figure 3:
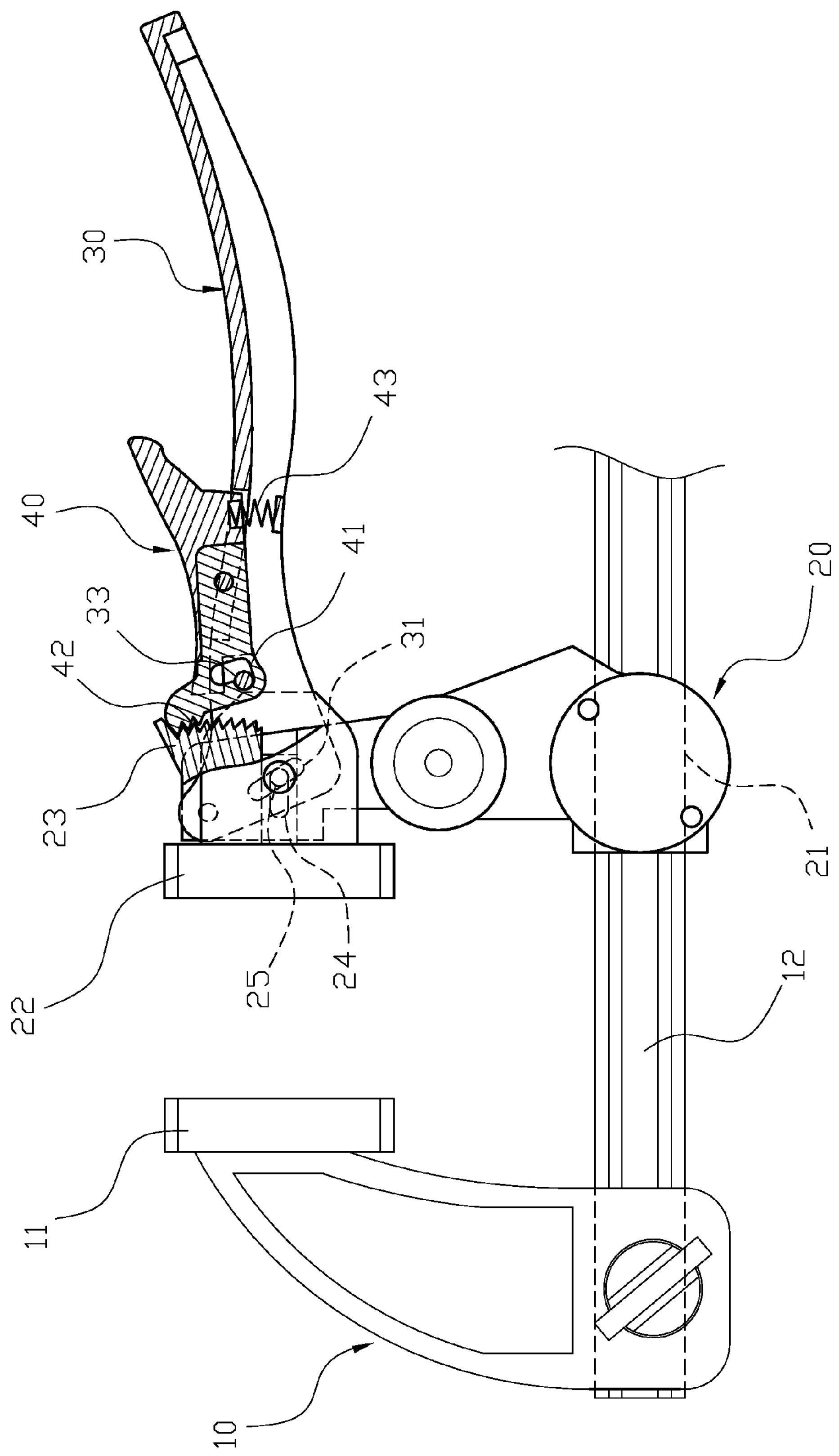
FIG. 3 illustrates a partial sectional view of the clamp structure in the present invention

In order to further understand the goal, characteristics and effect of the present invention, a number of embodiments along with the drawings are illustrated as following:

Referring to FIGS. 1 to 3, a clamp releasing structure may include a fixed clamp 10, a movable clamp 20, a control handle 30 and a restricting unit 40. The fixed clamp 10 has a clamping block 11 and a rod 12. One end of the movable clamp 20 has a through hole 21 located at the rod 12 of the fixed clamp 10, while the other end of the movable clamp 20 has a clamping unit 22 which faces the clamping block 11. A teeth unit 23 is disposed at a rear side of the clamping unit 22, and an elongated hole 24 is formed along the moving direction of the clamping unit 22. The clamping unit 22 further includes a shaft rod 25 that inserts into the elongated hole 24.

One end of the control handle 30 is connected to the movable clamp 20 and clamping unit 22, and the control handle 30 has an elongated groove 31 for the shaft rod 25 to pass through, and the control handle 30 can drive the shaft rod 25 through the elongated groove 31 to move along the elongated hole 24, so the control handle 30 can achieve a clamping effect through the clamping unit 22 and clamping block 11. The control handle 30 also has a receiving slot 32 near the teeth unit 23, and a plug 33 is disposed on both sides of the receiving slot 32. The restricting unit 40 disposed at the receiving slot 32 of the control handle 30 has a non-circular elongated slot 41, and one end of the restricting unit 40 facing the teeth unit 23 forms a teeth portion 42 while the other end thereof has a resilient unit 43. The resilient unit 43 is configured to press the control handle 30 so the teeth portion 42 and teeth unit 23 are engaged with each other at all time. When the restricting unit 40 is trying to separate the teeth portion 42 and teeth unit 23, the restricting unit 40 moves along the elongated slot to drive the teeth portion 42 to move backwards to separate from the teeth unit 23.

Figure 4:
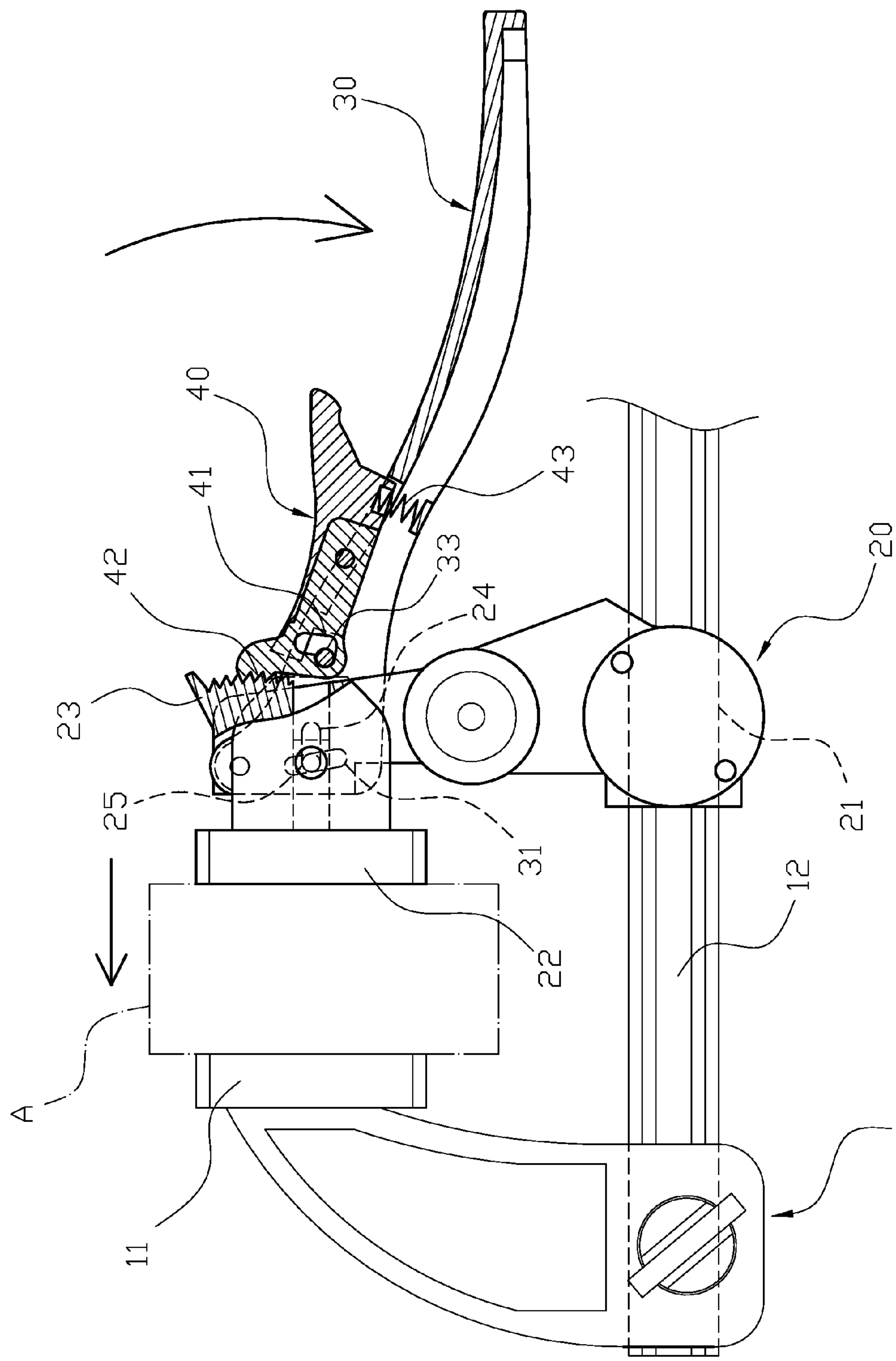
FIG. 4 illustrates a schematic view of the clamp structure in use in the present invention.
Figure 5:
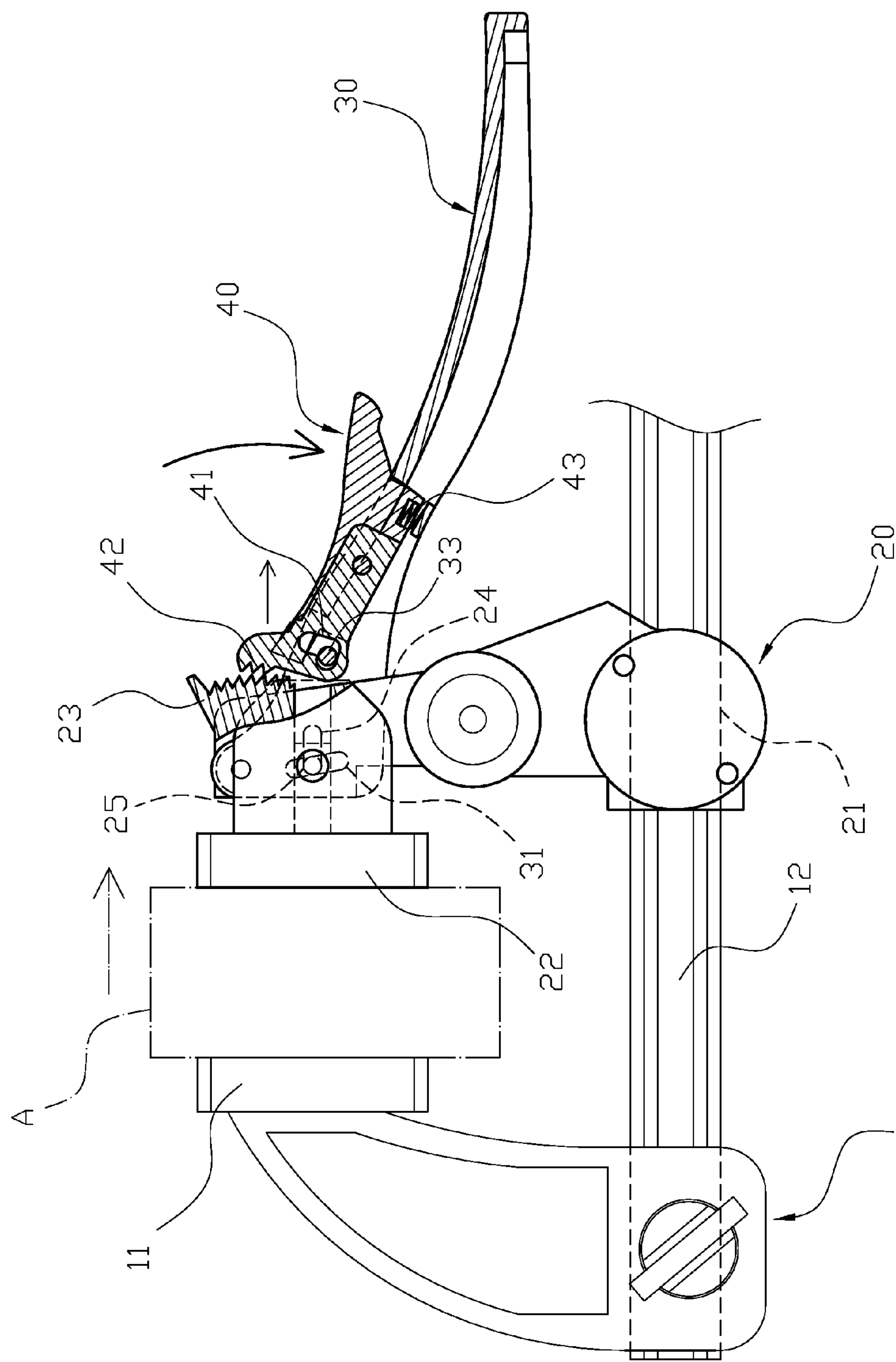
FIG. 5 illustrates another schematic view of the clamp structure in use in the present invention.

When in use, referring to FIGS. 2, 4 and 5, when a clamping action is taking place, the movable clamp 20 moves along the rod 12 through the through hole 21 so the clamping block 11 of the fixed clamp 10 and the clamping unit 22 of the movable clamp 20 can touch an object A. The control handle 30 is further pressed down to pivotally drive the elongated groove 31 to obliquely push the shaft rod 25, so the shaft rod 25 can move along the elongated hole 24 of the movable clamp 20 toward the object A to press the clamping unit 22 to quickly clamp the object A. While the control handle 30 is pressed down, the control handle 30 and the restricting unit 40 are moved down simultaneously, so the teeth portion 42 of the restricting unit 40 is pushed by the teeth unit 23 and the resilient unit 43 to enable the engagement of the teeth portion 42 and teeth unit 23, and achieve the restricting effect of the movable clamp 20 and control handle 30. It is noted that even though the user does not apply any force to the control handle 30 at the present stage, the teeth unit 23 and teeth portion 40 are still engaged with each other to stably clamp the object A through the clamping block 11 and clamping unit 22. Since there is a counterforce against the clamping unit 22, the teeth unit 23 is tightly engaged with the teeth portion 42 so the teeth portion 42 is not easy to separate from the teeth unit 23 when the user wants to release the clamp object. When directing pressing the resilient unit 43 of the restricting unit 40, the restricting unit 40 can be moved near the plug 33. More specifically, a gap is formed between the elongated slot 41 and shaft rod 25, and the restricting unit 40 would move along the plug 33 through the elongated slot 41 and the teeth portion 42 can be separated from the teeth unit 23 in a backward manner.

Figure 6:
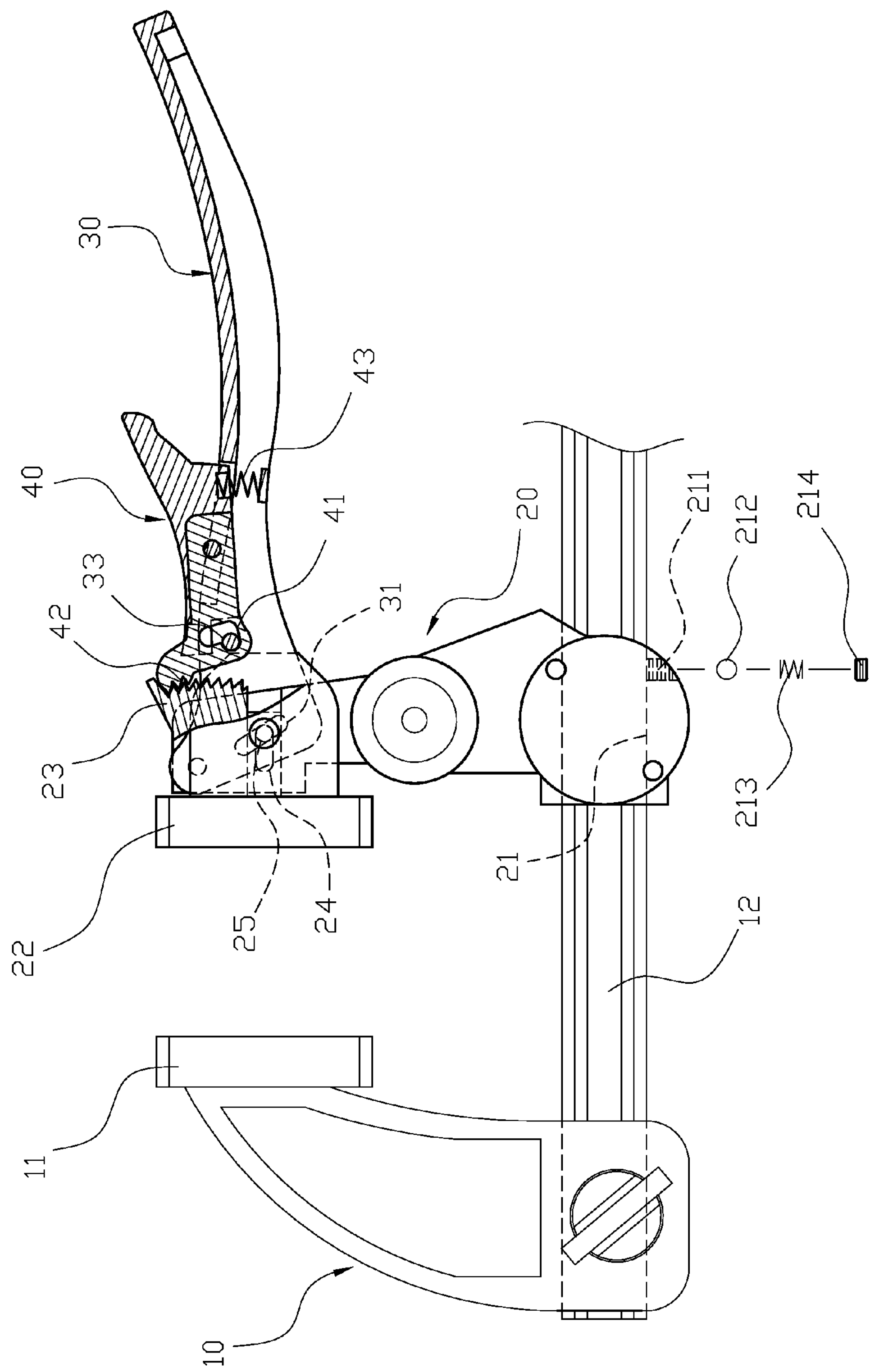
FIG. 6 illustrates another embodiment of the clamp structure in use in the present invention.
Figure 7:
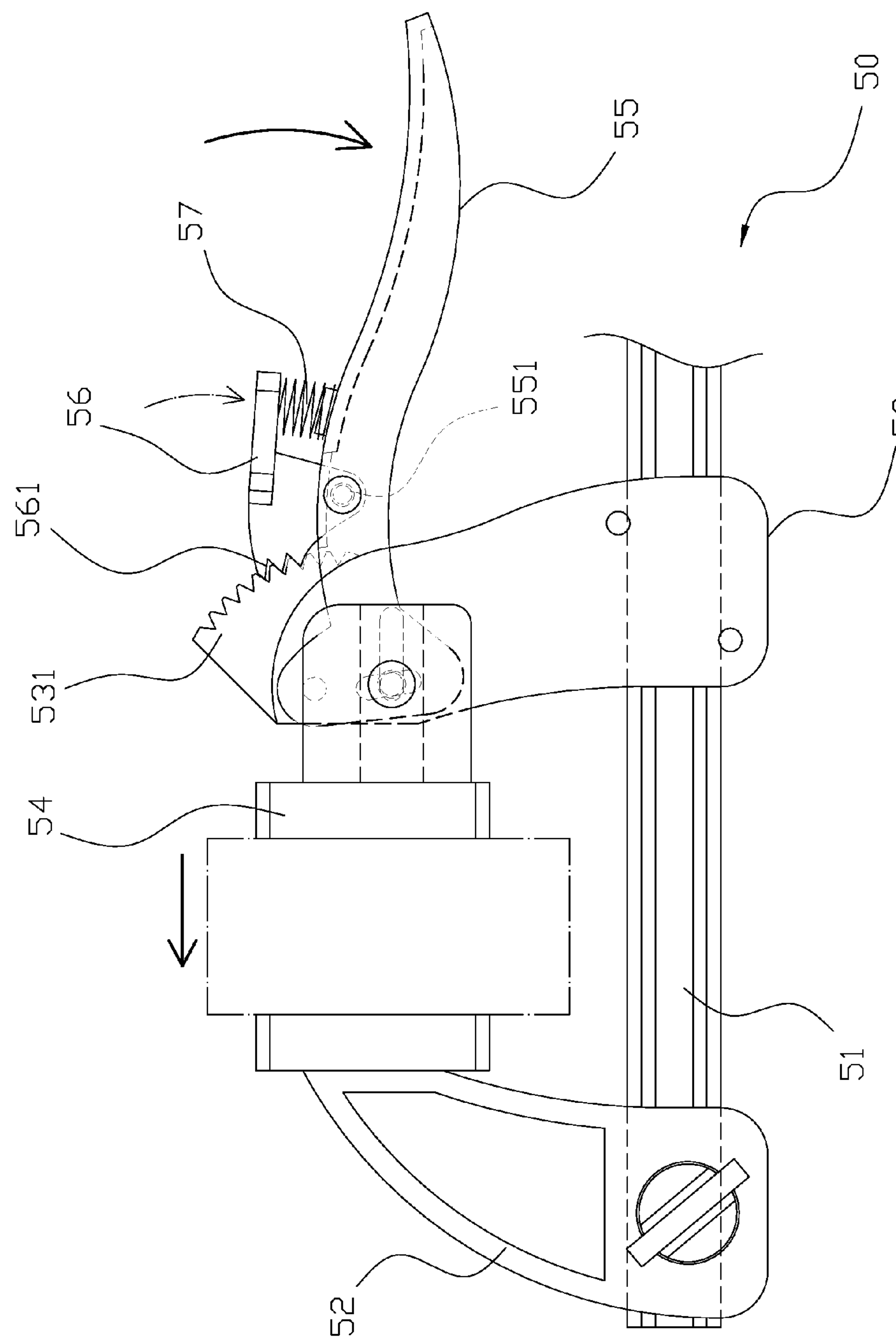
FIG. 7 illustrates a prior art.

In another embodiment, referring to FIG. 6, a screw hole 211 is formed at the through hole 21 of the movable clamp 20, and a rolling ball 212 and a spring 213 are disposed in the screw hole 211. A locking unit 214 is further disposed at the screw hole 211, so the rolling ball 212 can be resiliently disposed against the rod 12 to eliminate the gap between the movable clamp 20 and the rod 12 to increase the smoothness of the movement of the movable clamp 20.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A clamp comprising:

a fixed clamp, having a clamping block and a rod;

a movable clamp, one end of which having a through hole located at the rod of the fixed clamp, while the other end of the movable clamp having a clamping unit which faces the clamping block; a teeth unit disposed at a rear side of the clamping unit;

a control handle, one end of which connected to the movable clamp and clamping unit, and the control handle drives the clamping unit and the clamping block to achieve a clamping effect; the control handle having a receiving slot near the teeth unit, and a plug disposed on both sides of the receiving slot; and a restricting unit having a non-circular elongated slot and disposed at the receiving slot of the control handle and the plug passing through the elongated slot, and one end of the restricting unit facing the teeth unit having a teeth portion while the other end thereof has a resilient unit configured to press the control handle so the teeth portion and teeth unit engaged with each other; wherein the restricting unit is pressed to separate the teeth portion and teeth unit, and the restricting unit moves along the elongated slot to drive the teeth portion to move backwards to separate from the teeth unit.

2. The clamp of claim 1, wherein an elongated hole is formed along the moving direction of the clamping unit, and the clamping unit includes a shaft rod that inserts into the elongated hole; and the control handle has an elongated groove for the shaft rod to pass through, and the control handle drives the shaft rod through the elongated groove to move along the elongated hole.

3. The clamp of claim 1, wherein a screw hole is formed at the through hole of the movable clamp, and a rolling ball and a spring are disposed in the screw hole; a locking unit is further disposed at the screw hole, so the rolling ball is disposed against the rod.

* * * * *